United States Patent
Angioletti et al.

[15] 3,672,484
[45] June 27, 1972

[54] PASSENGER CONVEYOR

[72] Inventors: Attilio E. Angioletti; Sergio G. Marocco, both of Milan, Italy

[73] Assignee: Industrie Pirelli S.p.A., Milan, Italy

[22] Filed: Sept. 21, 1970

[21] Appl. No.: 73,691

Related U.S. Application Data

[63] Continuation-in-part of Ser. No. 780,921, Dec. 3, 1968, Pat. No. 3,583,543.

[30] Foreign Application Priority Data

Sept. 30, 1969 Italy..................................22681 A/69

[52] U.S. Cl..........................................198/16, 198/110
[51] Int. Cl.........................................B66b 9/12, B65g 21/12
[58] Field of Search..................198/17, 16, 18, 110; 104/20, 104/25, 18

[56] References Cited

UNITED STATES PATENTS

| | | | |
|---|---|---|---|
| 1,412,896 | 4/1922 | Sachs | 104/25 |
| 3,365,051 | 1/1968 | Mullis et al. | 198/16 X |

FOREIGN PATENTS OR APPLICATIONS

| | | | |
|---|---|---|---|
| 677,546 | 12/1964 | Italy | 198/110 |
| 724,088 | 4/1932 | France | 198/16 |

*Primary Examiner*—Joseph Wegbreit
*Assistant Examiner*—H. S. Lane
*Attorney*—Stevens, Davis, Miller & Mosher

[57] ABSTRACT

A passenger conveyor having a high speed central zone joined at the respective ends by initial and terminal zones having gradually building up and slowing down speeds obtained by respectively elongating and shortening the support surface formed by the conveyor. The elongation and shortening takes place by virtue of the relative sliding movement of adjacent plates moved by a main drive means with which each plate engages and is temporarily connected thereto. The plates travel along a closed circuit and passenger convenience handles are also provided to move along with the plates to aid the passengers. The upper path of the conveyor is rectilinear while the lower return path has a rectilinear central portion and downwardly sloped end portions. Auxiliary drive means are provided at each end of the conveyor to transfer the plates between the upper and lower portions.

14 Claims, 10 Drawing Figures

INVENTORS
ATTILIO ANGIOLETTI
SERGIO MAROCCO

BY *Stevens, Davis, Miller & Mosher*
ATTORNEYS

PASSENGER CONVEYOR

CROSS-REFERENCE TO RELATED APPLICATIONS

The present application constitutes a continuation-in-part of our application, Ser. No. 780,921 filed Dec. 3, 1968, now U.S. Pat. No. 3,583,543 issued June 8, 1971 and represents an improvement in the invention described in said application.

BACKGROUND OF THE INVENTION

The passenger conveyor described in our above mentioned patent application, Ser. No. 780,921 is formed by a plurality of plates moving along a closed circuit defined by two rectilinear, parallel and superimposed portions connected to each other at each end by two semi-circular portions forming return rollers to complete the closed circuit of the plates. A drive belt is mounted within the closed circuit followed by the plates and has a dimension slightly smaller than the circuit itself. The drive belt imparts a constant speed motion to the plates. At initial and terminal portions of the upper rectilinear portion, where there is no drive belt, means are provided to cause the sliding of one plate on the other in order to give rise to an acceleration or deceleration effect. These means are formed by a hinge on each side of each plate mounted parallel to the direction of motion, by a plurality of articulated parallelograms connecting the plates together at the hinges and by guides for acting upon the articulated parallelograms.

It is an object of the present invention to improve the passenger conveyor described in the above mentioned patent application by reducing its cost and at the same time to ameliorate its operation.

An object of the present invention is therefore to provide an improved passenger conveyor comprising initial and terminal zones of gradually increasing and decreasing speeds, respectively, obtained by elongating and shortening the support surface formed by a plurality of partially superimposed plates. The elongating and shortening takes place by means of relative sliding of adjacent plates upon one another as they are moved by a main drive belt, with which the plates engage and are temporarily connected thereto in a portion of the conveyor driven at a rated speed. The plates travel along a closed circuit formed by two superimposed portions connected to each other by two semi-circular terminal portions. Convenience handles are provided for the passengers in a manner similar to that described in patent application, Ser. No. 780,921 and follow substantially the same path as the plates. The upper portion of the conveyor is rectilinear while the lower portion has rectilinear central zone and downwardly sloping end zones. An auxiliary drive belt is provided at each of these semi-circular terminal portions. The auxiliary drive belt travels at a given speed and engages with the plates along the whole semi-circular path between the lower and upper portions.

The fact that the auxiliary drive belts at the terminal portions of the passenger conveyor replace the return roller provided in the above mentioned application has the result that the only plates which are not engaged with the auxiliary drive belt and with the main drive belt are those which travel along the variable speed zones so that the transmission of motion between adjacent plates through the articulated parallelograms, which could give rise friction, is limited only to the variable speed zones.

Thus, it is possible to obtain the following advantages with the present invention:

Friction is reduced in the low speed zones where friction would be particularly relevent on account of the small angle formed by the connecting rods constituting the articulated parallelograms; and it is possible, as a consequence of the reduced friction, to place before and/or after the variable speed portions a large number of plates traveling at low speed to aid the passengers in steadying themselves on the conveyor.

A further object of the present invention is to provide an improved passenger conveyor in which in the terminal zone of the conveyor, at the lower portion where the plates leave the auxiliary drive belt, the plates lean on one another in a condition of maximum superimposition and they proceed, pushed by one another, so as to form a surplus. Bumpers are provided on each of the plates.

The above-indicated feature provides the advantage that the tension of the main drive belt can be adjusted. The presence of a surplus of plates is consistant with the fact that main drive belt is extensible within certain limits by virtue of even the small amount of elasticity of the materials by which it is formed.

As a matter of fact, the amount of elongation of the main drive belt is variable with time and is not readily calculable before manufacture. Such an elongation increases in proportion to operation time, and in any case is not equal to a multiple of the distance between two adjacent plates. The length of the closed circuit followed by the plates is instead fixed and invariable with time. Since the plates engage with the drive belt along most of their travel, it is necessary to provide in said travel a zone where the mutual position of two adjacent plates is not pre-established and to ensure that the number of traveling plates in the zone in which the distance between the plates is fixed may vary. This zone is constituted by the surplus of plates.

A further object of the present invention is to provide an improved passenger conveyor in which the plates are provided with a pin and hook on each side, parallel to the direction of motion. The pins of one plate are engagable with the hooks of the adjacent plate when the plates are in a condition of minimum superimposition. This arrangement provides the following advantages:

The contact rollers provided in application, Ser. No. 780,921 at the upper rectilinear portion followed by the plates to ensure their perfect and complete adherence to the main drive belt can be eliminated;

the excavation cost for the passenger conveyor is reduced since the plates, during their return travel, lie substantially in the plane of the motion; and the aerodynamic resistance to the motion of the plates in the lower portion is reduced since they lie substantially in the plane of motion.

A still further object of the present invention is to provide an improved passenger conveyor having convenience handles for the passengers which consist of substantially L-shaped elements whose arms are of different lengths and form therebetween an angle $\alpha$ greater than 90° but smaller than 180°. Each element is connected at its vertex to a hinge of the respective plates and a wheel is provided at the free end of the shorter arm by which the end is made moveable within actuating and guiding means for the wheels. Gripping means are provided at the free end of the longer arm. By providing handles having the above-noted characteristics, a simple construction of a passenger conveyor handle is obtained.

A still further object of the present invention is to provide an improved passenger conveyor having means for guiding and actuating the wheel provided at the end of the short arm of the L-shaped handle element which comprises:

A bilateral guide, extending the entire length upper portion of the closed circuit followed by the plates;

a unilateral guide extending along the lower portion of the conveyor where the main drive belt is provided;

a unilateral guide along each terminal zone connecting the upper and lower portions; and switch means at the points joining the guides of the terminal zones and the guide of the lower portion.

The advantage derived from the assembly of guides forming the above-described system, together with the particular type of handles indicated above, is that of reducing the expense for the excavation related to installation of the passenger conveyor. The guides allow the handles to move in such a way that the longer arm of the L-shaped element is maintained nearly parallel to the direction of motion of the plates during return travel along the greatest part of the lower portion of the conveyor.

The means for accomplishing the foregoing objects and other advantages, which will be apparent to those skilled in the art, are set forth in the following specification and claims and are illustrated in the accompanying drawings dealing with a basic embodiment of the present invention. Reference is made now to the drawings in which:

Figure 1:
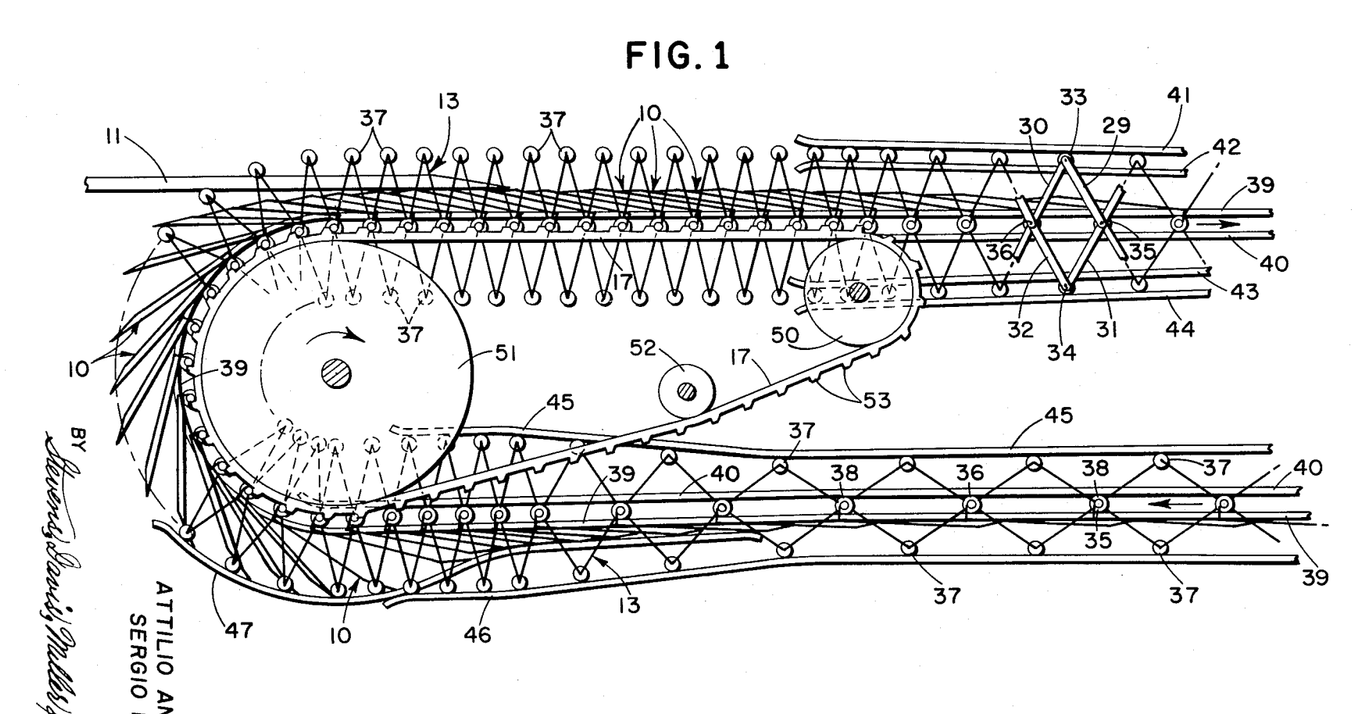
FIG. 1 is a partially diagrammatic side view of the initial or accelerating portion of the passenger conveyor.
Figure 2:
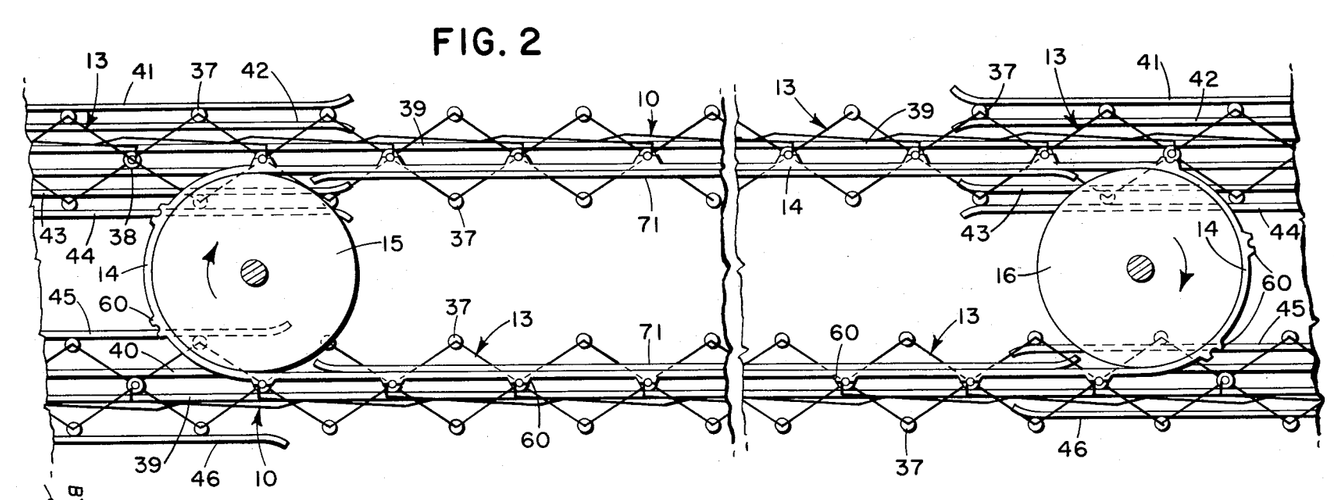
FIG. 2 is a partially diagrammatic, fragmentary, side view of the central or high speed portion of the passenger conveyor.
Figure 3:
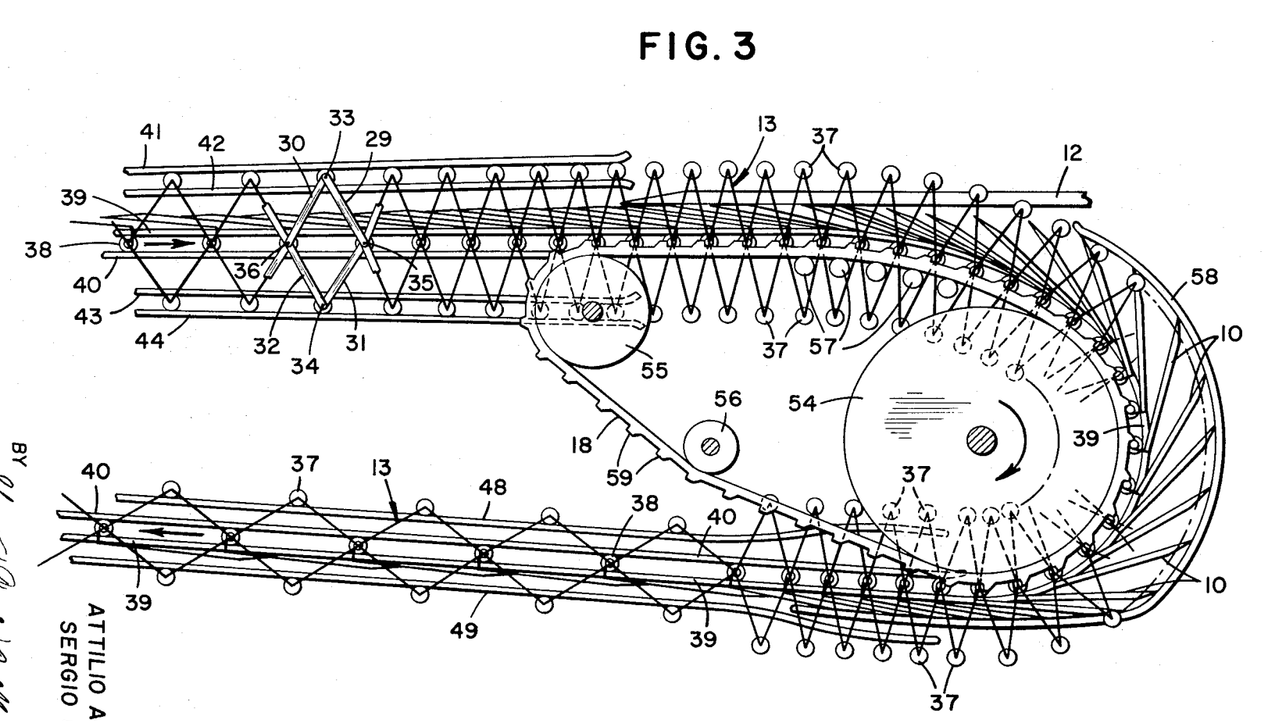
FIG. 3 is a partially diagrammatic side view of the terminal or decelerating portion of the passenger conveyor.

FIGS. 1, 2, and 3 show the passenger conveyor which is comprised of a plurality of plates 10 which move in a closed circuit formed by an upper rectilinear travel portion and a lower articulated return portion both of which are connected by semi-circular terminal portions, as noted in FIGS. 1 and 3. In particular the lower portion consists of a central rectilinear portion parallel to the upper rectilinear portion and by two downwardly sloping end portions. Fixed platforms 11 and 12 are provided for the passengers approaching and leaving the conveyor and are provided adjacent the ends of the upper rectilinear portion. Each plate 10 is connected to the adjacent plates by means of a plurality of articulated parallelograms 13.

A main drive belt 14 (FIG. 2) is disposed within the closed circuit followed by the plates, namely, at the central portion of the circuit where the upper and lower portions are parallel. The main drive belt has dimensions slightly smaller than the closed circuit of the plates and serves to impart a driving force to the plates. The main drive belt is driven between the two rollers 15 and 16 by means not shown.

Auxiliary drive belts 17 and 18, described in detail herebelow, are provided at the initial and terminal portions of the passenger conveyor (FIGS. 1 and 3, respectively). The auxiliary drive belts 17 and 18 have the task of imparting motion to the plates in the end portions of the passenger conveyor and moving the plates between the lower portion to the upper portion. The auxiliary drive belts 17 and 18 travel at the same speed, which speed is lower than that of the main drive belt 14.

In the zones of the upper and lower portions followed by the plates, where they are not engaged by the drive belts, provision is made for rails for guiding and actuating the articulated parallelograms 13, which will be described in detail herebelow, in order to originate the relative sliding movement between adjacent plates, which movement is necessary for the acceleration and deceleration.

The passenger conveyor is moreover provided with handles 19 (FIGS. 7 and 8) which travel along the same closed circuit followed by the plates, means being provided for guiding the handles. The handles 19 and their associated guiding means will be described in detail herebelow.

Figure 4:
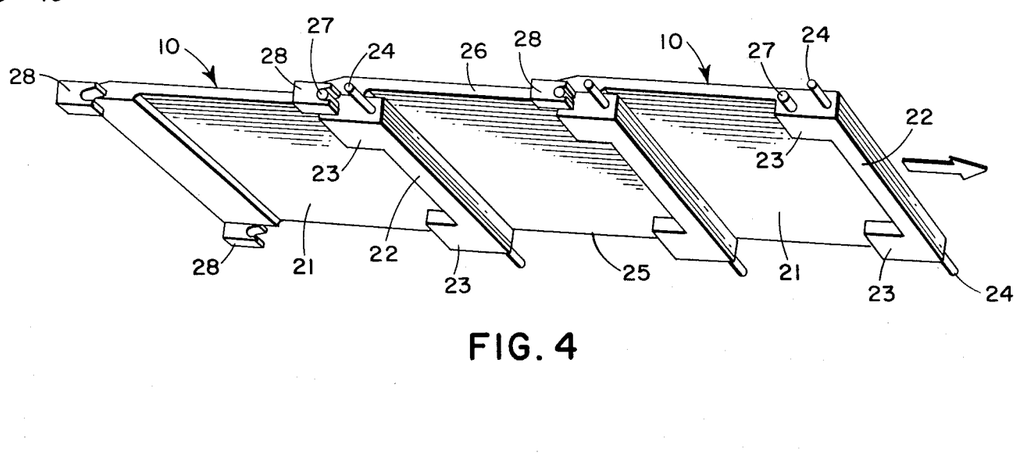
FIG. 4 is a bottom perspective view of three plates in a condition of minimum superimposition.
Figure 5:
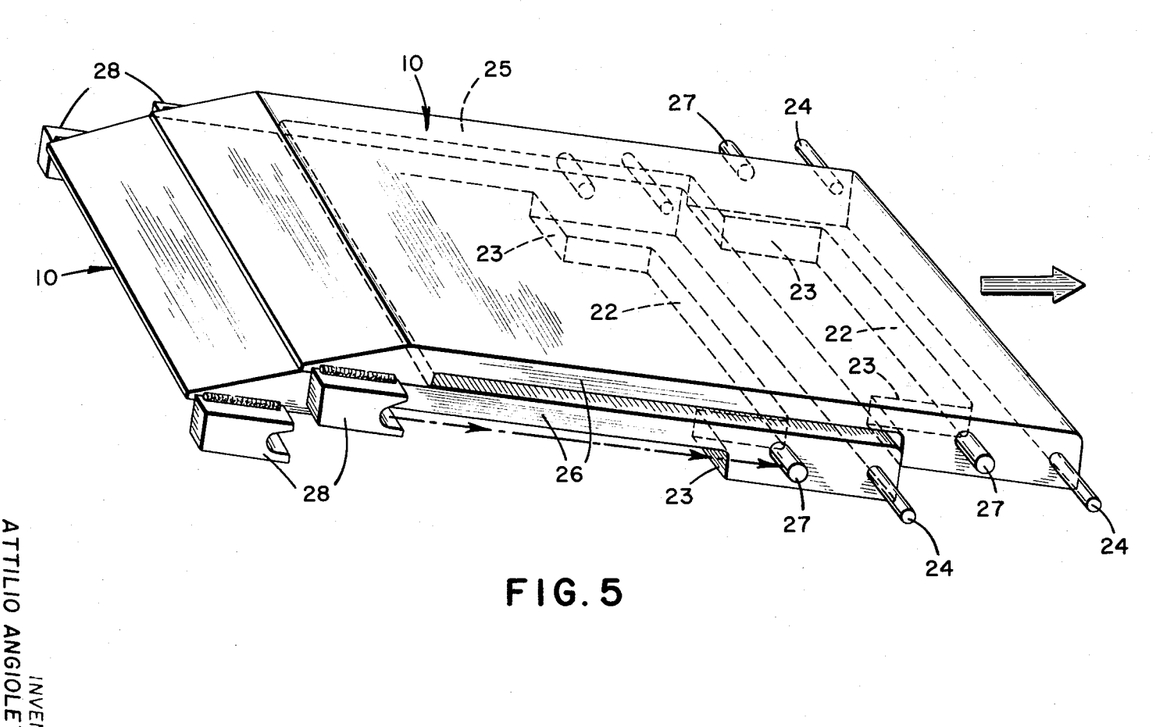
FIG. 5 is a top perspective view of two plates in a condition of maximum superimposition.

Considering now the particulars of construction as shown in FIGS. 4 and 5, it should be noted that the plates have a substantially rectangular shape. The upper face 20 of the plate constitutes the passenger supporting surface. The lower face 21 of the plate, at the side which is first to advance in the direction of motion, has a preferably integral bar-like member 22 provided with two rearwardly directed extensions 23. Rods 24 are mounted in the bar member 22 to extend laterally outwardly from the sides 25 and 26 of the plates perpendicular to the direction of travel. Also a cylindrical member 27 and a hook 28 are projecting outwardly from the sides 25 and 26 of each plate 10.

Figure 6:
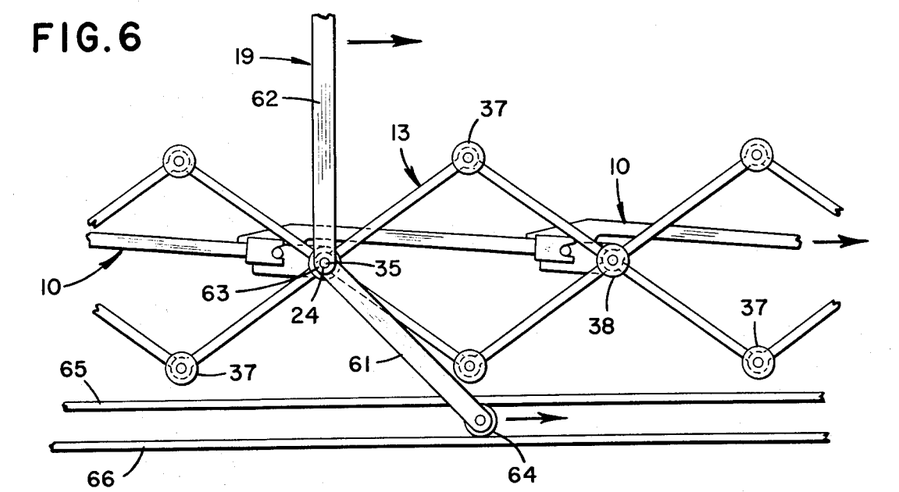
FIG. 6 is a side elevation showing details of the assembly relative to one plate.

FIG. 4 illustrates three plates in a condition of minimum superimposition while FIG. 5 illustrates two plates in a condition of maximum superimposition. It will be noted from FIG. 5 that the extensions 23 of the bar-like member 22 act as bumpers between adjacent plates when the plates are in a condition of maximum superimposition and maintain the position of the plates in such a condition. It will also be noted from FIG. 4 that when the plates are in a condition of minimum superimposition the cylindrical members 27 of one plate engage with the hooks 28 of the adjacent plate, which preceeds it in the direction of motion of the conveyor, thus preventing the plates from rotating accidentally upward in the upper portion of the closed circuit and downward in the lower portion of the closed circuit. As noted above in relation to FIGS. 1, 2 and 3, the plates 10 are connected to one another by means of the articulated parallelograms 13. These parallelograms have been omitted from FIGS. 4 and 5 for the sake of clarity. However, the details of connection of a parallelogram and handle to a plate are shown in FIG. 6.

Two contiguous plates 10 are connected to each other by two articulated parallelograms, one for each of the sides and parallel to the direction of motion. Each articulated parallelogram (See FIGS. 1 to 3) is formed by four rods 29, 30, 31 and 32 joined together by hinges 33, 34, 35 and 36, respectively. The pins of the two opposite hinges 35 and 36, are formed by the rods 24 on the plates while the pins of the remaining hinges 33 and 34 constitute shafts for wheels 37. Wheels 38 are also provided on the hinges 35 and 36.

Pairs of guiding rails 39 and 40, within which the wheels 38 slide, are provided at the upper and lower portion of the closed circuit followed by the plates. The pairs of guiding rails 39 and 40 prolong in the rectilinear portions of the connecting zones for the initial and terminal portions of the conveyor. The single guide rail 39 continues through the curved portions of the connecting zones for the initial and terminal portions of the conveyor and has the task of maintaining the plates in engagement with the auxiliary drive belts 17 and 18. Moreover in the upper and lower portions of the closed circuit, adjacent the main drive belt 14, there are chutes 71.

In the zones of the upper portion, where there is no drive belt 14, 17 or 18, provision is made for pairs of guiding rails 41–42 and 43–44 with which the wheels 37 carried by the hinges 33 and 34 of the articulated parallelograms engage. The distance between the pairs of guiding rails 41–42 and 43–44 is a maximum in proximity to the auxiliary drive belts 17 and 18 and a minimum in the proximity of the main drive belt 14.

In the zones of the lower portion, where there is no drive belt 14, 17 or 18, namely, that portion which is not parallel to the upper rectilinear portion, provision is made for further guiding rails for the wheels 37 of the articulated parallelograms. More precisely, guiding rails 45 and 46 are provided at the initial portion of the conveyor (FIG. 1) and the wheels 37 of the articulated parallelograms engage the opposing faces of the rails 45 and 46. The distance between the rails 45 and 46 is a minimum in the proximity of the main drive belt 14 and is a maximum in the proximity of the auxiliary drive belt 17.

In this zone where, as a consequence of the reduced distance between two adjacent plates 10, the hooks 28 disengage from the cylindrical members 27, there is a rail or chute 47 intended to support the plates and to prevent them from suddenly taking a vertical position under the force of gravity.

Guiding rails 48 and 49 are also present at the terminal portion of the conveyor (FIG. 3) and the wheels 37 of the articulated parallelograms engage the outer faces of these rails. The distance between the rails 48 and 49 is the minimum in the proximity of the main drive belt 14 and is a maximum in the proximity of the auxiliary drive belt 18. In the proximity of the auxiliary drive belt 18 the distance between the rails 48 and 49 is less than the distance between the hinges 33 and 34 of the articulated parallelograms 13 and in this zone the plates are in a condition of maximum superimposition. In the zone where the plates 10 have just left the auxiliary drive belt 18, the wheels 37 do not engage the rails 48 and 49 and the plates 10 are pressed one against the other in a condition of maximum superimposition in order to form a surplus of plates. The mutual position of adjacent plates in this zone is determined by the presence of the extensions 23 of the plates since each plate 10 presses against the one that preceeds it in the direction of motion.

The auxiliary drive belt 17 present in the initial portion of the passenger conveyor (FIG. 1) is passed between two rollers 50 and 51, which are a return roller and a driving roller, respectively, and is placed under tension by a tension roller 52. The axes of rotation of the rollers 50, 51 and 52 are horizontal, parallel to one another, and perpendicular to the direction of motion of the plates.

The rollers 50 and 51 are practically tangent to the upper rectilinear portion of the closed circuit followed by the plates. In particular, the distance between the axes of rotation of the rollers 50 and 51 and the plane containing the axes of rotation of the wheels 38 of the plates 10 is equal to the radius of the cylindrical surfaces of said rollers plus the thickness of the band and plus the vertical overall dimensions of the bar-like members 22 of the plates 10.

The curved portion of the closed circuit followed by the plates in the initial portion of the conveyor constitutes a cylindrical surface whose axis coincides with the axis of rotation of the roller 51. The upper end of the cylindrical surface approximately tangent to the upper rectilinear portion and the lower end is tangent to the downward slope of the lower portion.

The surface of the auxiliary drive belt 17 which comes into contact with the rollers 50, 51 and 52 is smooth while the surface opposite it is provided with a plurality of outwardly directed ribs 53 disposed transversely of the belt itself. The ribs 53 engage with bars 22 of the plates 10 and impart to them a driving force so that the plates are caused to move at the same speed as the auxiliary drive belt 17.

The auxiliary drive belt 18 is arranged between driving roller 54 and a return roller 55 in the terminal portion of the conveyor (FIG. 3) and is placed under tension by a tension roller 56. Below part of the uppermost portion of the auxiliary drive belt 18, between the rollers 54 and 55, there are several auxiliary rollers 57 for supporting the belt 18; the length of the rollers being substantially equal to the width of the belt. The highest portion of the auxiliary drive belt 18 where the rollers 57 are present is near the roller 55. The axes of rotation of the rollers 57 lies on a curved surface and consequently the auxiliary driving belt 18 at said rollers 57 has a curved configuration in accordance with the above cited surface.

As can be seen from FIG. 3, the uppermost portion of the auxiliary drive belt 18 between the rollers 54 and 55 is rectilinear towards the roller 55 and curved towards the roller 54.

The overturning of the plates 10 takes place at the curved portion of the auxiliary drive belt 18. A rail or chute 58, on which the ends of the plates 10 slide is provided in this position. The rail or chute 58 has the task of controlling the gradual overturning of the plates 10. The curved configuration of the uppermost portion of the auxiliary drive belt 18 is needed for carrying out the overturning of the plates and keep them completely below the horizontal platform 12 during this operation.

The axes of rotation of rollers 54, 55 and 56 and of rollers 57 are parallel to one another and horizontal; said axes being perpendicular to the direction of motion of the plates. The roller 55 is practically tangent to the upper rectilinear portion of the conveyor. More precisely, the distance between the axis of rotation of the roller 55 and the plane containing the axes of rotation of the wheels 38 of the plates 10 is equal to the radius of said roller 55 plus the thickness of the drive belt plus the vertical overall dimensions of the bar-like members 22 of the plates 10.

The curbed portion of the closed circuit followed by the plates in the terminal portion of the conveyor, corresponding to the contacting surface of the auxiliary drive belt 18 and the roller 54, is a cylindrical surface whose axis coincides with the axis of rotation of the roller itself. The upper end of this curved portion is connected to the curve originated by the rollers 57; downward end to the surplus of the plates 10.

The surface of the auxiliary drive belt 18 which comes into contact with rollers 54, 55, 56 and rollers 57 is smooth whereas the surface opposite it is provided with a plurality of outwardly directed ribs 59 disposed transversely of the belt itself. The ribs 59 engage with the bar-like members 22 of plates 10 and impart to them the driving force so that they are caused to move at the same speed as the auxiliary driving belt 18. It should be noted here that tension rollers 52 and 56 provide tension in the associated auxiliary driving belt by being biased by conventional means, not shown.

The main drive belt 14 also has a smooth surface which comes into contact with rollers 15 and 16. The surface opposite the smooth surface is provided with a plurality of outwardly directed ribs 60 disposed transversely of the belt itself. The ribs 60 engage with the bar-like members 22 of the plates 10 and impart to them the driving force causing them to move at the same speed as the main drive belt 14. The distance between two adjacent ribs 60 of the main drive belt 14 is equal to the distance between the bar-like members 22 of two adjacent plates 10 in a condition of minimum superimposition.

The distance between two adjacent ribs 53 of the auxiliary drive belt 17 is equal to the distance between two adjacent ribs 59 of the auxiliary drive belt 18 and said distance is equal to the distance between the bar-like members 22 of two adjacent plates 10 in a condition of maximum superimposition. The ratio between the distance between two adjacent ribs 60 of the main drive belt 14 and the distance between two adjacent ribs 53 and 59 of the auxiliary drive belts 17 and 18, respectively, is equal to the ratio between the maximum speed (or rated speed) of the plates and their minimum (or initial and terminal) speed.

As indicated above, the passenger conveyor is provided with a plurality of handles 19 (FIGS. 7 and 8) which move along the same closed circuit followed by the plates. The handles 19 are constituted by substantially L-shaped handles whose arms 61 and 62 are of different length and form therebetween an angle $\alpha$ which is greater than 90° and less than 180°. The L-shaped handles are pivotally mounted at their vertices 63 in the rods 24 of plates 10 (See FIG. 6). A wheel 64 is provided on the free end of the shorter arm 61.

Means, not illustrated, are provided for facilitating the gripping the end of the longer arm 62 by the passengers. The wheel 64 is slideably guided within a means for guiding and actuating the handles 19. The means for guiding and actuating the handles 19 include guiding and actuating means at the upper rectilinear portion; guiding and actuating means at the curved portions of the initial and terminal portions of the passenger conveyor, each of which composes a curved portion and the downwardly sloped end portions of the lower portion; and guiding means at the central lower portion.

In particular, along the upper rectilinear portion the guiding and actuating means consists of a pair of rails 65 and 66 between which the wheels 64 slide. The distance between the rails 65 and 66 is slightly greater than the diameter of the wheels 64 and said pair of rails constitutes a bilateral guide for said wheels.

The rectilinear path followed by the axis of rotation of the wheels 64 is at a distance from the path followed by the vertex 63 of the L-shaped handles 19 which is equal to the product of the length of arm 61 by the sine of the angle $\beta = (\alpha - 90°)$.

In this way the arm 62 of the L-shaped handle is vertical in its movement along the upper rectilinear portion of the conveyor.

In the initial portion of the conveyor (FIG. 7) the rail 66 is interrupted at the curved portion of the path followed by the plates 10. The rail 65, on the other hand, extends around the curved portion of the closed circuit followed by the plates and in the end of the lower portion, constituting the means for unilateral guiding and actuation of the handles 19 in the initial portion of the conveyor.

Figure 7:
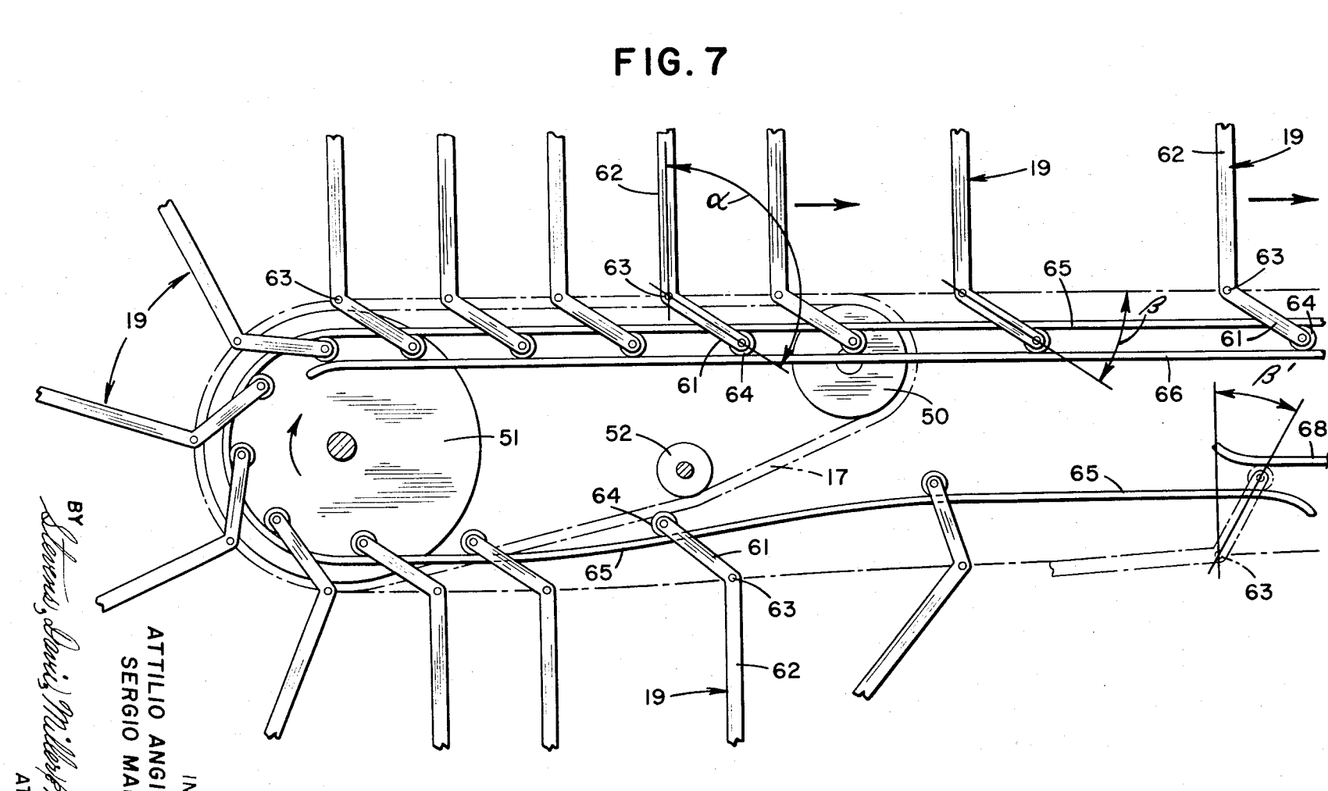
FIG. 7 is a partially diagrammatic side view of the rails for guiding the handles in the initial or accelerating portion of the conveyor.

At the curved portion, the radial distance between the path of the wheels 64 traveling along the rail 65 and the path followed by the vertex 63 of the L-shaped handle is equal to the distance existing between said paths in the upper rectilinear portion.

At the extreme portion of the lower portion, the distance between the path of the wheels 64 traveling along the rail 65 and the path followed by the vertex 63 of the L-shaped handle decreases gradually from a value equal to the product of the length of the arm 61 of the L-shaped element by the cosine of the angle $\beta^1$ (slightly smaller than the value of $\alpha - 90°$) to the value of the radial distance of the curved portion.

In the terminal portion of the passenger conveyor (FIG. 8) the rail 65 is also interrupted at the end of the curved portion of the path followed by the plates.

Figure 8:
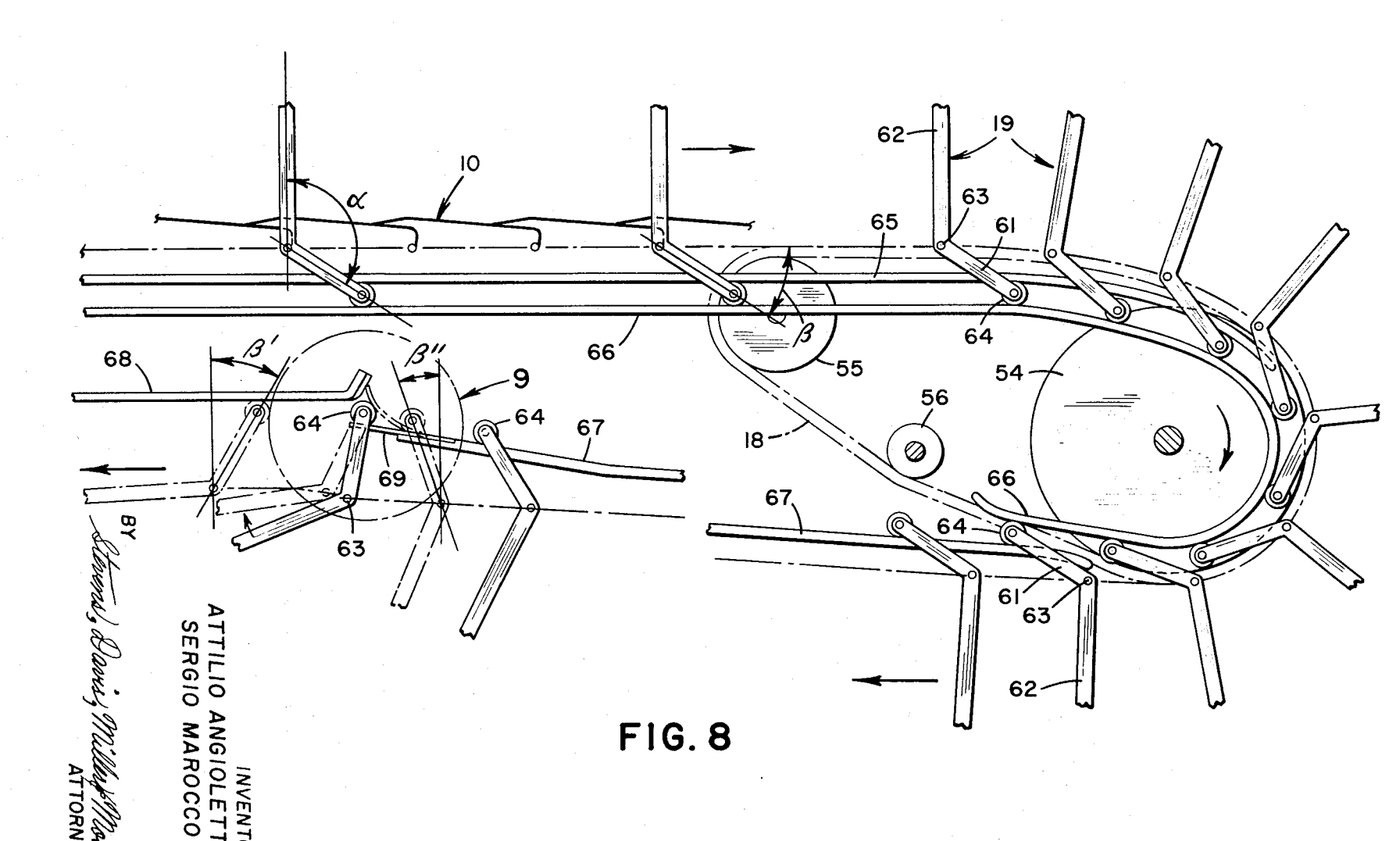
FIG. 8 is a partially diagrammatic side view of the rails for guiding the handles in the terminal or decelerating portion of the conveyor.

The rail 66, on the other hand, extends around the curved portion of the path followed by the plates at a radial distance between the path of the wheel 64 traveling along the rail 66 and the path followed by the vertices 63 of the L-shaped handle equal to the distance between these paths in the upper rectilinear portion.

The rail 66 is interrupted at the lower end portion where it is adjacent to a rail 67. The curved portion of the rail 66 and the rail 67 together form the means for the unilateral guiding and actuation of the handles 19 at the terminal portion of the passenger conveyor.

In the extreme lower portion, the distance between the path of the wheels 64 traveling along rail 67 and the path of the vertex 41 of the L-shaped handle increases gradually until it reaches a value equal to the product of the length of the arm 61 of the L-shaped handle multiplied by the cosine of angle $\beta^{11}$ which, in absolute value, is equal to angle $\beta^1$.

In the central lower portion followed by the plates, there is a rail 68 on which the wheels 64 slide. The distance between the path of vertices 63 of the L-shaped handle is equal to the product of the length of arm 61 multiplied by the cosine of angle $\beta^1$, slightly smaller than the value ($\alpha - 90°$).

The rail 68 constitutes the means for the unilateral guiding and actuation of the handles 19 of the conveyor in the central lower portion. In this central lower portion, the arm 62 of the L-shaped handle is nearly parallel to the direction of motion of the plates. It can be seen from FIG. 7 that the wheels 64 run on the interface of the rail 65 and on the outer face of the rail 68. It can also be seen from FIG. 8 that the wheels 64 run on the outer face of the rail 66 and on the innerface of the rail 67 and on the outer face of the rail 68.

Switch means are provided at the point where the wheels 64 pass from one rail to another. The switch means between the rails 68 and the rail 65 (at the initial portion of the conveyor) and the switch means between the rail 66 and the rail 67 (at the terminal portion of the conveyor) are constituted by the simple superimposition of said rails for a short length at a distance slightly greater than the diameter of the wheels 64.

The switch means between the rails 67 and 68 (at the terminal portion of the conveyor) are constituted by a flat spring 69 (See FIG. 9) which forms an extension of the rail 67. The mechanical and geometric characteristics of spring 69 are such as to impart to the wheels 64, during their passage from the rail 67 to the rail 68, a thrust in the direction opposite to the motion of the plates which is sufficient to originate a rotation of the handles 19 about the vertices 63 of a value twice that of angle $\beta^1$. In this way the angle formed by the arm 61 of the L-shaped handle with a vertical line changes in sign, being converted from a value $\beta^{11}$ to a value $\beta^1$. Disposition of the arm 62 of the L-shaped handle nearly parallel to the direction of motion of the plates corresponds to the angle $\beta^1$. This disposition of the arm 62 of the L-shaped handle is maintained along the central lower portion followed by the plates by virtue of the presence of the rail 68.

Figures 9, 10:
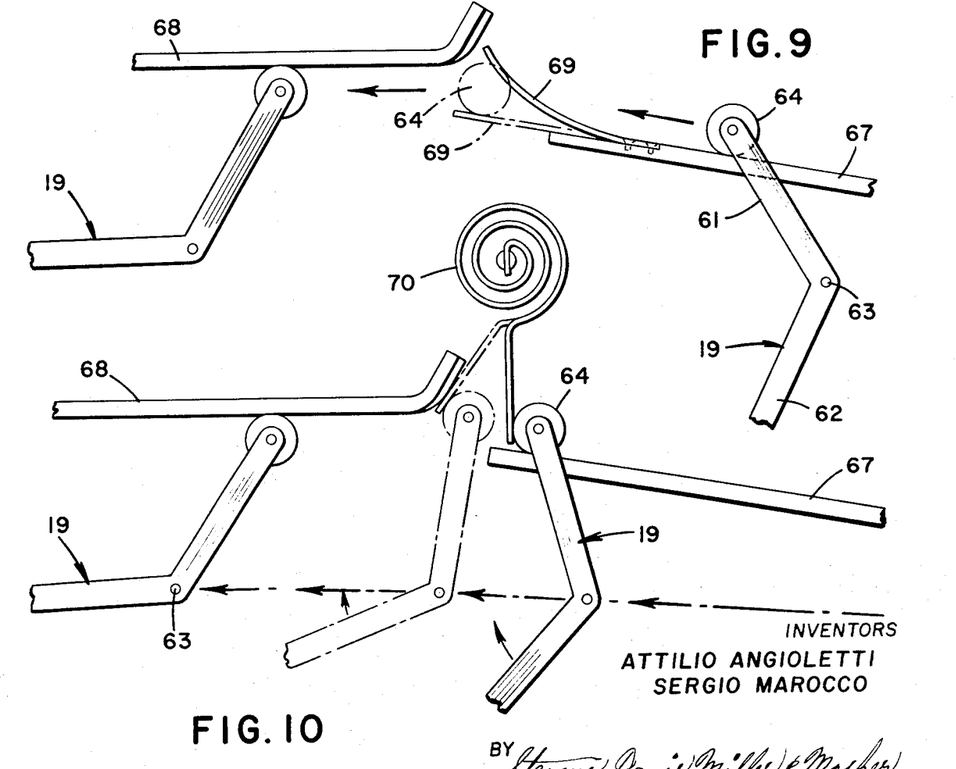
FIG. 9 is an enlargement of the area enclosed by dot and dashed line 9 of FIG. 8.
FIG. 10 is an alternative embodiment of the switch system shown in FIGS. 8 and 9.

According to an alternate embodiment illustrated in FIG. 10 the switch means between the rails 67 and 68 are constituted by a spiral spring 70 one end of which is interposed perpendicularly above the two rails. The task of spring 70 is to impart to the wheels 64 a thrust in the sense opposite to the motion of the plates in order to originate the rotation of the arm 62 which changes from the position it had before being switched to a position nearly parallel to the direction of the motion of the plates.

Of course bilateral guides may be provided where unilateral guides have been shown to increase the safety of operation of the conveyor.

Although some preferred embodiments of the present invention have been described and illustrated it is understood that the present invention may be embodied in other specific forms without departing from the spirit or essential characteristics thereof. The present embodiment is therefore to be considered in all respects as illustrative and not restrictive, the scope of the invention being indicated by the appended claims, rather than the foregoing description, and all changes which come within the meaning and range of equivalency of the claims are therefore to be embraced therein.

What is claimed as new is:

1. An improved passenger conveyor with an initial zone of accelerating speed, a central high speed zone and a terminal zone of decelerating speed having a plurality of plates forming a passenger supporting surface and moving on support frame means, where the speed variation is obtained by relative sliding of adjacent plates arranged to follow a closed circuit including a rectilinear upper travel path, a lower return path, and semi-circular transfer paths connecting the upper and lower paths, said plates being interconnected by articulated parallelogram means, said passenger conveyor comprising main drive means, to which the plates are removably connected, arranged to guide and simultaneously to impart motion individually to each plate along said central zone at constant high speed;

auxiliary drive means to which the plates are removably connected, arranged in said initial and terminal zones to guide and simultaneously to impart motion individually to each plate at constant low speed; guide means for the articulated parallelogram means being provided only between the main drive means and the auxiliary drive means, whereby friction is reduced; and a plurality of convenience handles for the passengers, said handles being connected to at least some of said plates at regular spaced intervals.

2. An improved passenger conveyor according to claim 1, wherein each said auxiliary drive means comprises a drive belt on which lie the plates in condition of maximum Superimposition, and rollers for moving said drive belt.

3. An improved passenger conveyor according to claim 2 wherein the auxiliary drive means at the terminal zone of the passenger conveyor further comprises a plurality of auxiliary rollers whose length is at least equal to the width of the belt means of said auxiliary drive means, said auxiliary rollers being disposed along the highest portion of the path between the first and second roller with their axes of rotation being parallel to each other and defining a curved surface.

4. An improved passenger conveyor according to claim 2 wherein each of said plates further comprises on each side of each plate parallel to the direction of motion, pin means and hook means, respectively, disposed on the leading and trailing ends of said side with respect to the direction of motion, the pins of one plate being engageable with the hooks of an adjacent plate when the plates are in condition of minimum superimposition.

5. An improved passenger conveyor according to claim 1 wherein said handles each comprise a substantially L-shaped element the arms of which are of different lengths and the form therebetween an angle $\alpha$ which is greater than 90° and less than 180°, each said element being pivotally connected at its vertex to the means connecting said plates to said parallelogram means, a wheel mounted on the free end of the shorter arms means for guiding and actuating said handles, said wheels moving within said guiding and actuating means, means for the passenger to grip said handle at the free end of the longer arm.

6. An improved passenger conveyor according to claim 5 wherein said means for guiding and actuating the handles comprise a bilateral guide means extending along the whole upper travel path of the closed circuit followed by the plates, a unilateral guide means extending along at least part of the lower return path of the conveyor adjacent the main drive means, a unilateral guide at each transfer path and switch means at the points joining the guides of the tranSfer paths and the returning path guide.

7. An improved passenger conveyor according to claim 6 wherein said bilateral guide in the upper path comprises a pair of rails disposed below the plane of sliding of the plates with the mid-line of said pair of rails at a distance from the path of the vertices of the L-shaped handle elements equal to the product of the length of the shorter arm of said handle by the sine of angle $\beta = (\alpha-90)°$ and that the wheel carried by the shorter arm runs between said pair of rails.

8. An improved passenger conveyor according to claim 6 wherein said unilateral guide in the terminal transfer path adjacent the main drive means imparts a motion to the plates themselves and comprises a rail disposed above the plane of sliding of the plates with the distance between said rail and the path of the vertices of the handles is equal to the product of length of the shorter arm of the handle by the cosine of the angle $\beta^1$, the wheel on said shorter arm of the handle running below said rail.

9. An improved passenger conveyor as claimed in claim 6 wherein the unilateral guide in the transfer path at the initial portion of the passenger conveyor comprises a rail constituting a prolongation of the upper rail forming part of the pair of rails present in the upper travel path, said rail being disposed inwardly of the circuit followed by the plates, the distance of said rail from the path of vertices of the handles at the main drive means equaling the product of the length of the shorter arm of the handle by cosine of angle $\beta^1$, said distance gradually decreasing until at the curved portion it reaches a value equal to the distance between the upper rail making part of the pair of rails of the upper rectilinear travel path and the corresponding path of the vertices of the handles.

10. An improved passenger conveyor according to claim 6 wherein the unilateral guide in the transfer path at the terminal portion of the conveyor comprises two consecutive rails, switch means joining said consecutive rails, one rail corresponding to the curve of said transfer path and the other to the extreme rectilinear of the return path, said unilateral guide of the transfer path being disposed inwardly of the circuit followed by the plates at a distance from the path of the vertices of the handles equal to the distance between the lower rail and the corresponding path of the vertices of the handles, said distance gradually increasing towards the main drive means.

11. An improved passenger conveyor according to claim 10 further comprising switch means joining together the two consecutive rails forming the unilateral guide of the transfer path at the terminal portion of the conveyor, said switch means comprising the superimposition of the end of the rail of the transfer path on the end of the rail of the lower return path.

12. An improved passenger conveyor according to claim 6 further comprising switch means at the initial transfer path of the conveyor constituted by the superimposition of the end of the rail forming the unilateral guide of the lower return path on the end of the rail forming the unilateral guide of the transfer path, the distance between the facing ends of said rails being slightly greater than the diameter of the wheel provided at the end of the shorter arm of the handle.

13. An improved passenger conveyor according to claim 6 wherein switch means between the guides in the terminal portion of the conveyor comprises a spiral spring one end of which is arranged vertically in a space between the end of the rail constituting unilateral guide of the transfer path and the end of the rail constituting the unilateral guide of the return path.

14. An improved passenger conveyor according to claim 6 wherein the switch means between the guides in the terminal portion of the conveyor comprises a flat spring constituting an extension of the rail forming the unilateral guide of the transfer path below the end of the rail constituting the unilateral guide of the return path.

* * * * *